US008244118B2

(12) United States Patent
Stansbury

(10) Patent No.: US 8,244,118 B2
(45) Date of Patent: Aug. 14, 2012

(54) UNDERWATER CAMERA HOUSING CONTROLS

(76) Inventor: Gregg M. Stansbury, Maple Valley, WA (US)

( * ) Notice: Subject to any disclaimer, the term of this patent is extended or adjusted under 35 U.S.C. 154(b) by 0 days.

(21) Appl. No.: 12/925,847

(22) Filed: Oct. 29, 2010

(65) Prior Publication Data

US 2011/0110653 A1 May 12, 2011

Related U.S. Application Data

(60) Provisional application No. 61/255,983, filed on Oct. 29, 2009.

(51) Int. Cl.
*G03B 17/08* (2006.01)
(52) U.S. Cl. ................. 396/25; 396/26; 396/27; 396/28; 396/29; 310/337; 335/209
(58) Field of Classification Search .................... 396/25, 396/27, 195, 444
See application file for complete search history.

(56) References Cited

U.S. PATENT DOCUMENTS

| | | | | | |
|---|---|---|---|---|---|
| 2,487,868 | A | * | 11/1949 | Grigsby | 396/27 |
| 2,573,885 | A | * | 11/1951 | Whitman et al. | 396/27 |
| 2,949,938 | A | * | 8/1960 | Urquhart | 139/251 |
| 3,601,026 | A | * | 8/1971 | Ettischer | 396/354 |
| 3,641,893 | A | * | 2/1972 | Takahama | 396/27 |
| 3,673,941 | A | * | 7/1972 | Williams | 396/392 |
| 3,703,131 | A | * | 11/1972 | Brigham | 396/189 |
| 3,860,937 | A | * | 1/1975 | Wolfe | 396/27 |
| 4,041,507 | A | * | 8/1977 | Chan et al. | 396/28 |
| 4,095,070 | A | * | 6/1978 | Simpson | 200/525 |
| 4,168,897 | A | * | 9/1979 | Gates | 396/25 |
| 4,265,523 | A | * | 5/1981 | Defuans | 396/29 |
| 4,363,547 | A | * | 12/1982 | Hashimoto et al. | 396/411 |
| 4,634,253 | A | * | 1/1987 | Tamamura | 396/25 |
| 4,996,544 | A | * | 2/1991 | Fiorda | 396/29 |
| 4,999,664 | A | * | 3/1991 | Foust | 396/26 |
| 5,126,772 | A | * | 6/1992 | Albrecht | 396/26 |
| 5,239,324 | A | * | 8/1993 | Ohmura et al. | 396/27 |
| 5,285,894 | A | * | 2/1994 | Kamata et al. | 206/316.1 |
| 5,339,124 | A | * | 8/1994 | Harms | 396/27 |
| 5,446,513 | A | * | 8/1995 | Sato | 396/401 |
| 5,508,766 | A | * | 4/1996 | Boyd et al. | 396/27 |
| 5,729,769 | A | * | 3/1998 | Rydelek | 396/29 |
| 5,870,640 | A | * | 2/1999 | DiRisio et al. | 396/401 |
| 6,400,911 | B1 | * | 6/2002 | Schroder | 396/401 |
| 6,574,429 | B1 | * | 6/2003 | Smith et al. | 396/6 |
| 6,574,435 | B1 | * | 6/2003 | Smith et al. | 396/29 |
| 6,580,878 | B2 | * | 6/2003 | DiRisio | 396/396 |
| 6,618,555 | B2 | * | 9/2003 | Stiehler et al. | 396/6 |
| 6,636,697 | B2 | * | 10/2003 | Smith et al. | 396/26 |
| 6,786,657 | B2 | * | 9/2004 | Dirisio et al. | 396/493 |

(Continued)

*Primary Examiner* — Clayton E LaBalle
*Assistant Examiner* — Kevin Butler
(74) *Attorney, Agent, or Firm* — Svendsen Legal, LLC

(57) ABSTRACT

A control system for an underwater camera housing, including a pin assembly within the housing wall. The pin has a clamp ring and a set of O-rings at an end of the pin. The pin is received into a well in the housing. A spring is received into a bushing also positioned within the well, with the pin inserted into the center of the spring, and the spring compressed against the seat of the bushing by the clamp ring. The pin is depress-able to contact a control button of the housed camera. The control system additionally includes a knob rotatably attached to the housing's exterior. The knob has a boss magnet to move a worker magnet positioned on the housing's interior. The knob is rotatable to move the boss magnet, and so move the worker magnet, to control functions of the housed camera.

9 Claims, 3 Drawing Sheets

U.S. PATENT DOCUMENTS

| | | | |
|---|---|---|---|
| 6,987,527 B2 * | 1/2006 | Kossin | 348/81 |
| 7,082,264 B2 * | 7/2006 | Watanabe et al. | 396/28 |
| 7,385,645 B2 * | 6/2008 | Boon | 348/373 |
| 7,801,425 B2 * | 9/2010 | Fantone et al. | 396/27 |
| 8,027,576 B2 * | 9/2011 | Lai | 396/25 |
| 2003/0118331 A1 * | 6/2003 | Stiehler et al. | 396/6 |
| 2003/0118332 A1 * | 6/2003 | Smith et al. | 396/27 |
| 2003/0118333 A1 * | 6/2003 | Smith et al. | 396/29 |
| 2003/0118334 A1 * | 6/2003 | Smith et al. | 396/29 |
| 2005/0168567 A1 * | 8/2005 | Boon | 348/25 |
| 2006/0008261 A1 * | 1/2006 | Watanabe et al. | 396/25 |
| 2006/0115249 A1 * | 6/2006 | Mochinushi et al. | 396/29 |
| 2007/0071423 A1 * | 3/2007 | Fantone et al. | 396/27 |
| 2008/0308396 A1 * | 12/2008 | Matsumoto et al. | 200/341 |
| 2009/0092385 A1 * | 4/2009 | Cullen et al. | 396/25 |
| 2009/0110380 A1 * | 4/2009 | Fantone et al. | 396/27 |
| 2011/0110653 A1 * | 5/2011 | Stansbury | 396/25 |

* cited by examiner

UNDERWATER CAMERA HOUSING CONTROLS

This Non-Provisional Application claims priority to Provisional Patent Application Ser. No. 61/255,983, filed Oct. 29, 2009.

TECHNICAL FIELD

Manually actuated controls for use in an underwater camera housing, and specifically a leak-proof and water-tight magnetic control for an underwater camera, including a reliable spring-loaded camera control, and a manual knob on the exterior of the housing coupled to an actuator located within the housing's interior.

BACKGROUND OF THE INVENTION

Cameras are sometimes water resistant, at best, and most can never be submerged in water without severe dammage to the camera. The Contour™ HD and GPS models of video cameras, as manufactured by Contour, Inc. of Seattle, Wash., are lightweight and specially designed for outdoor uses. However, these cameras are not designed for underwater use. There is a need for a retrofit camera casing or housing designed to enable use of the Contour camera for underwater use by a hobbyist scuba diver or snorkeler. Such a water-proof camera enclosure or case, would need to provide a user with manual control of the camera's multiple functions, underwater. Beyond the simple pressing of a button to activate a digital or mechanical power switch of the camera, other user actuated controls are required for acceptable, professional quality photos in underwater environments. Focus, speed, aperture settings and film advancement are needed adjustments. Modern, microprocessor controlled cameras are able to calculate many of these setting with adequate results without direct control by the user. However, record and stop recording remains a setting that requires user input. The present invention provides a control system integrated into an underwater camera housing specifically for the widely used Contour type camera, providing a direct user interfaces through the water-tight camera housing. The following is a disclosure of the present invention that will be understood by reference to the following detailed description taken in conjunction with the accompanying drawings.

Figure 1:
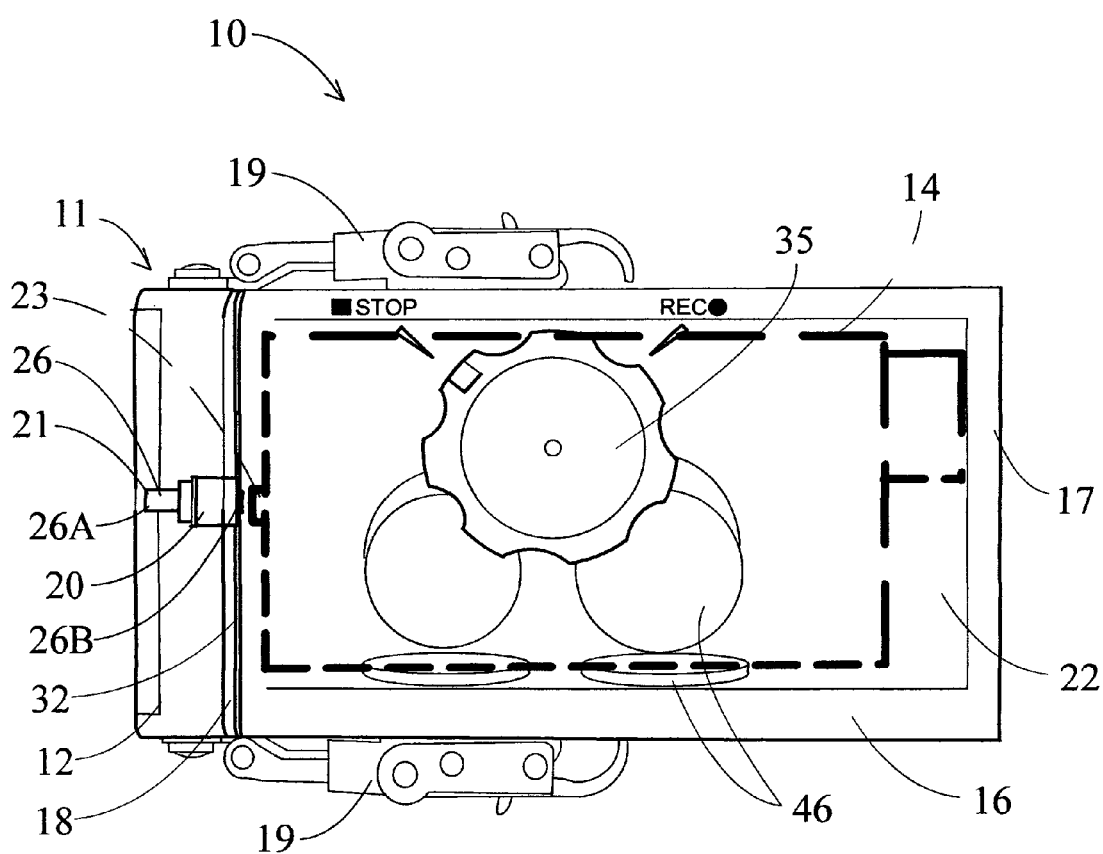
FIG. 1 is a side view of a control for an underwater camera housing, according to an embodiment of the invention.

Reference characters included in the above drawings indicate corresponding parts throughout the several views, as discussed herein. The description herein illustrates one preferred embodiment of the invention, in one form, and the description herein is not to be construed as limiting the scope of the invention in any manner. It should be understood that the above listed figures are not necessarily to scale and that the embodiments are sometimes illustrated by fragmentary views, graphic symbols, diagrammatic or schematic representations, and phantom lines. Details that are not necessary for an understanding of the present invention by one skilled in the technology of the invention, or render other details difficult to perceive, may have been omitted.

DETAILED DESCRIPTION OF SPECIFIC EMBODIMENTS

The invention provides a control system integrated into an underwater camera housing to provide direct control by a user through the water-tight camera enclosure or housing. The water-tight enclosure is designed to allow the camera to be submerged to depths of 400 feet, or more, with external controls for all the camera's necessary functions.

The control system 10 is shown in FIGS. 1 through 6, and may be referred to herein simply as the 'controls.' The controls are a component part of a housing 11 that includes a housing cover 12, which opens or is removable to receive a camera 14 within the housing. The preferred camera for use with the present invention is a Contour™ HD and GPS models of video cameras, as manufactured by Contour, Inc. of Seattle, Wash. Other Contour models such as the 720p and 1080p, and prior versions of the camera are considered for use, as well as any camera with similarly acting controls.

In a preferred embodiment as shown in FIG. 1, the housing 11 Is preferably approximately 3⅛ by 2 3/16 by 4½ inches in size, and made of a high grade, cell-cast acrylic, although it may be made from plexi-glass or poly carbonate and the housing most preferably has a scratch resistant coating on the lens coverage surface. The housing cover 12 is preferably approximately 3⅛ inches by 2 3/16 inches in size and made of a high grade cell cast acrylic, although it could also be made from other polymers. Preferably, as shown in FIG. 1, the housing cover is also part of a push-button control, with a magnetic or 'rotational' control located at the side of the housing, as detailed in FIG. 2.

The terms "approximately" or "approximate" are employed herein throughout, including this detailed description and the attached claims, with the understanding that is denotes a level of exactness as typical for the skill and precision in the generally applicable field of technology.

The housing 11 is used to allow the camera 14 to be submerged underwater, and allow a clear, unobstructed view for shooting underwater video. The housing is preferably in the form of a rectangular case, with a housing cover 12 and internal dimensions set to receive and closely fit a camera, shown with a dashed line in FIG. 1, to which the housing was specifically sized and designed for. The thickness of a housing wall 16 may be thinner or thicker depending on the pressure depth application desired. A lens portion 17 of the housing wall is part of the housing itself, but could be designed to be removable. Preferably, a scratch resistant coating is embedded onto the outside face of the lens. A separate lens cover could also be made to fit over the existing lens of the camera.

As shown in FIG. 1, the housing cover 12 is preferably held in place on the housing 11 with a pair of compression latches 19, which are most preferably stainless steel, typified by model No. HC-83314-SS compression spring latches, as manufactured by Nielsen Hardware of Binghamton, N.Y. The removal of the housing cover off the housing is easily accomplished by placing one hand over the back of the housing and pressing in the small safety catch on one of the latches. With the other hand, a user can lift up on the latch, allowing the latch to remain hooked to the cover until after this process is repeated process on the other side of the housing. The user can then insert the camera 14. In placing the housing cover on the housing, the user must make sure the cover is seated properly and not in contact with any part of the camera. The user can then set both latches loosely on the hooks or the cover and press down on both latches at the same time to seal the camera within.

The cover is sealed against he housing with a main O-ring 18, which is preferably an E70-231 EPDM type, which is ⅛ of an inch wide by 2⅝ inches ID.

Figure 4:
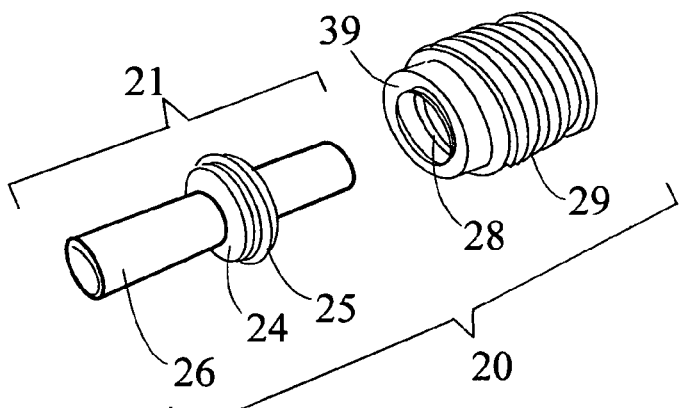
FIG. 4 is a partially exploded perspective view of a portion of a control for an underwater camera housing, according to an embodiment of the invention.
Figure 3:
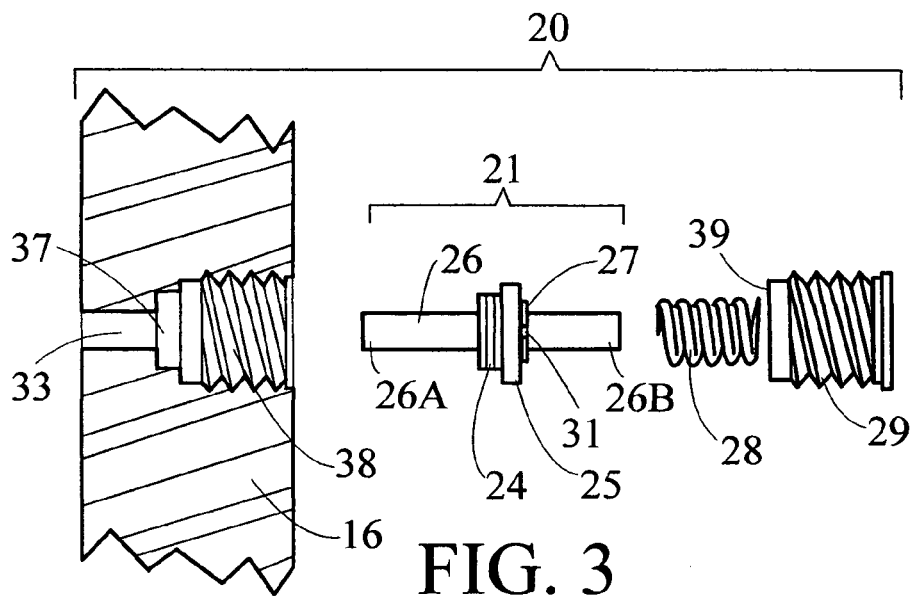
FIG. 3 is a partially sectioned side view of a portion of a control for an underwater camera housing, according to an embodiment of the invention.

The control system 10 of the present invention includes two control functions, both incorporated into and across the housing 11. Firstly, a push-button control 20 is employed through the housing wall 16, as shown in FIG. 1. Preferably, the push-button control actuates the power or alternatively the electronic or mechanical shutter of the camera 14, within the housing. As detailed in FIG. 3, the push-button control includes a gland O-ring 24. The 'gland O-ring' as referred to herein, is commonly referred to as a standard 'X-ring,' and also commercially known as a Quad-Ring®, and is typically employed in a wide variety of static and dynamic sealing applications. The preferred, four-lobed design of the X-ring provides twice the sealing surface in comparison to a standard O-ring. The X-ring provides a double-sealing action and less sealing pressure or 'squeeze' to maintain an effective seal. X-rings are designed to outperform a standard O-ring in dynamic sealing applications. The four-lobed or 'X' configuration creates a more stable seal and avoids spiraling and twisting. The gland O-ring for use with the present invention is preferably a standard, N70Q-008 Quad Ring, which is 1/16 of an inch thick by 3/16 inches ID. The gland O-ring 24 is mounted on a pin 26, as shown in FIG. 4, and against the housing 11, when the pin is inserted into the housing wall 16, as shown in FIG. 3. The gland O-ring is used to create a seal around the pin 26, which is preferably a stainless steel and has an exterior end 26A that is the user depressable and a movable part of the push-button control. The pin is incorporated into the housing cover 12 though a bushing 29, which is preferably a brass, stainless steel, or suitable plastic. The stainless-steel pin is preferably 1⅛ inches in length by 3/16 inches in diameter, and also includes an interior end 26B that extends through the housing wall to the inside or housing interior 22, for a push button style control of a power function switch 23 of the camera 14.

Figure 2:
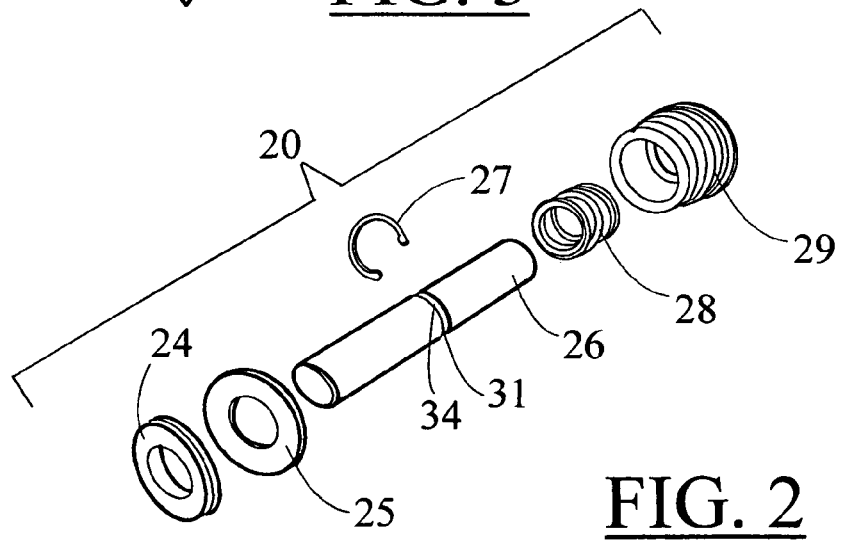
FIG. 2 is an exploded perspective view of a portion of a control for an underwater camera housing, according to an embodiment of the invention.

Coupled with, and immediately interior to the gland O-ring 24 as positioned within the housing wall 16, a washer 25 is also employed as shown in FIGS. 1 through 4. The washer is preferably formed of nylon or Nylatron™ and is approximately ⅛ inch thick by 3/16 inches ID. The washer is used as a separation between the gland O-ring 24 and a C-clamp ring 27. The C-clamp ring, or simply referred to herein as a "clamp ring," is shown in FIG. 2 and mounts on the pin 26 in a pin groove 31, as detailed in FIG. 3. The pin, the gland O-ring, the washer, and the clamp ring, together comprise a pin assembly 21, as shown in FIGS. 3 and 4, which moves as a unit within the housing wall.

The pin-grove 31 is preferably located approximately ½ of an inch from the exterior end 26A of the pin 26, at a mid-length location 34 to accommodate the C-clamp ring 27. The C-clamp ring securely snaps into the pin-grove on the pin, the C-clamp ring preferably 5/16 of an inch OD and 3/16 of an inch ID. The clamp ring is immovably seated within the pin-groove to allow pressure to be placed against a compression spring 28, when the exterior end of the pin is pushed by the user. The compression spring is a conventional spring, preferably of a stainless steel alloy, or otherwise typically selected for compression use in wet environments, and can be referred to herein simply as a "spring." Also in the alternative, the clamp ring could be generally, any ring or washer, immovably mounted to the pin and functionally equivalent to the clamp ring.

To provide recoil of the pin 26, the compression spring 28 is utilized within the bushing 29, as shown in FIGS. 2 through 4. The spring is preferably ⅜ of an inch in length by 3/16 inches ID and 19/64 inches OD, and is used to force the retraction of the pin from the bushing, after the exterior end 26A of the pin is pressed.

The bushing 29 is preferably ⅜ inch in diameter by ½ of an inch in length, and is used to receive the pin assembly 21 components of the push-button control 20. The center of the bushing is preferably drilled out to a diameter 19/32 of an inch, to a depth of ⅜ of an inch. This interior of the bushing is sized to accommodate the spring 28, as shown in FIG. 4.

For a preferred embodiment of the invention, to receive the components of the push-button control 20, the housing wall 16 of the housing cover 12 is drilled with three different sized holes at different depths, to provide a pin penetration 33, and allow the component hardware to function as the sealed spring-loaded, push button control. In this preferred embodiment, the first hole is 25/64 of an inch in diameter and drilled to a depth of 13/32 of an inch, the hole is then taped to allow the threaded insert of the bushing 29. This first hole is a bushing well 38, as shown in FIG. 3.

The second hole of the pin penetration 33 is 5/16 of an inch in diameter and is drilled at the center of the first hole of the bushing well 38, to a continued or additional depth of 3/64 of an inch. This allows a place for the gland o-ring 24 to set with the washer 25 abutted along side, within the housing wall 16. This second hole is a washer well 37, as shown in FIG. 3.

The third hole is the pin penetration 33 and is 3/16 of an inch in diameter. This hole is drilled in the center of the previous two holes bushing well 38 and the washer well 37, as described above, and continues through the remainder of the housing wall 16 of the housing cover 12. This hole allows the pin 26 to penetrate through the housing cover With the bushing 29 screwed into the bushing well, a bushing shoulder 39, as shown in FIGS. 3 and 4, contacts the washer 25. The bushing forces the washer 25 to seal against the gland O-ring 24 within the washer well. This seal prevents the entry of water through the pin penetration and entry into the housing interior 22, from either between the gland O-ring within the washer well, or between the pin and the gland O-ring.

With the C-clamp ring 27 securely mounted to the pin 26 and with the pin and compression spring 28 inserted into the bushing 29, the C-clamp pushes against the spring when depressed, allowing and forcing the pin to retract or return to its initial position by rebounding action of the spring, when the pin is released.

The acrylic pieces of the housing 11 or case are preferably cut from stock sheets of ⅜ inch cell cast material. All edges are preferably sanded, and bonded together with acrylic solvent. The edges are then routered at approximately ½ inches round, and finally fired. As discussed above, the lens portion 17 is cut out of scratch resistant coated material and bonded to one end of the case element with acrylic solvent, the edges are then fired for clarity. The case is drilled and taped in four locations for the latch hardware, two 3/32 inch holes on each side, 9/16 of an inch apart, and 1⅝ in from the open end of case. Install the hardware of the compression latches 19 preferably using six 3/32 inch diameter by 1/4 inch long stainless steel machine screws. The housing cover 12 is preferably cut from 3/4 inch acrylic material, and the inside edge preferably routered to 3/8 inches in thickness, as shown in FIG. 1, with a second 1/8 inch router grove around the perimeter for a main-ring seat 32. Additionally, the ring seat has the first 3/32 inches in depth radius cut with radius corners, for receiving the static, main O-ring 18.

All the components of the push-button control 20, as mounted within the housing wall 16, combine together to form a watertight 'control gland' that penetrates through the housing 11 for external control of the camera's 14 power function switch 23. The push-button control allows the camera's power or any other desired control, such as status functions, to be activated externally to the housing.

Figure 5:
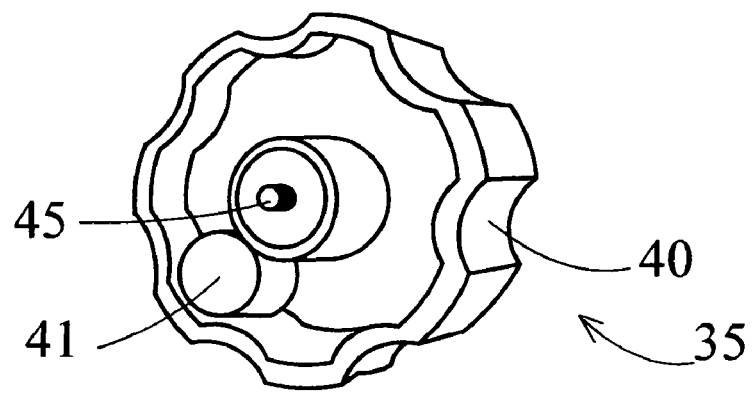
FIG. 5 is a perspective view of a portion of a control for an underwater camera housing, according to an embodiment of the invention.
Figure 6:
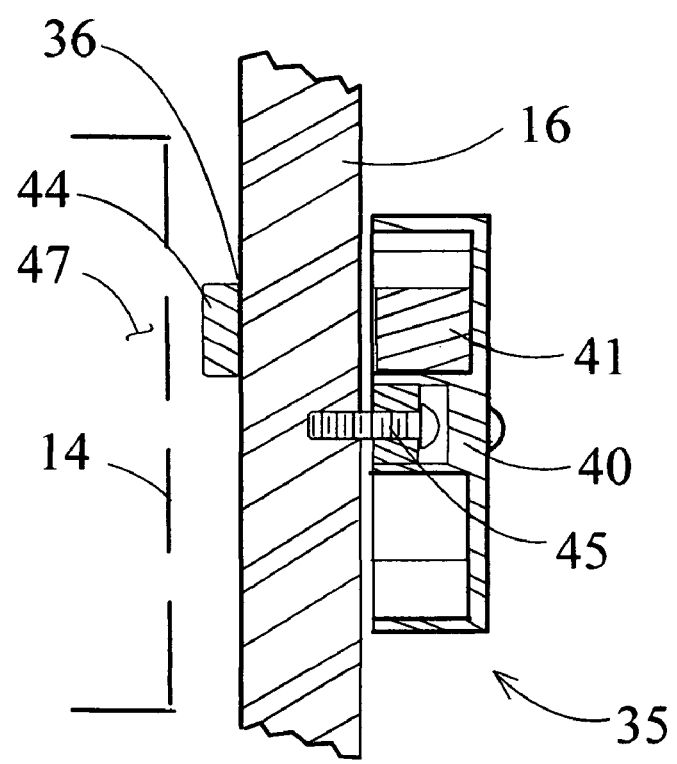
FIG. 6 is a sectioned side view of a portion of a control for an underwater camera housing, according to an embodiment of the invention.

The second control function of the control system 10 of the present invention includes a magnetic control knob 35, as shown in FIG. 1, also incorporated into and across the housing 11. The magnetic control knob includes a knob 40 as shown in FIG 5. The knob is preferably 1 1/2 inches in diameter by 5/16 on an inch thick, with a hollow interior to accommodate a knob magnet 41, as shown in FIGS. 5 and 6. The knob magnet is preferably a powerful permanent magnet made of neodymium. Most preferably, the neodymium magnet is approximately 3/8 inch in diameter by 1/8 inches thick, of a grade N52. The knob magnet is employed to activate the magnetic record switch inside the camera by moving an internal magnet 44, which floats on the inside surface of the housing wall 16, as shown in FIG. 6.

The record and start/stop control provided by the magnetic control knob 35 allows the camera's record start and stop functions to be controlled magnetically and externally of the housing 11. The knob 40 is installed by drilling and taping a hole 3/32 inches in diameter, 1/4 inch deep to receive the knob screw 45. The magnetic control with the knob components, are assembled and installed on the exterior of the housing. Additionally, camera support pads 46 are installed within the interior of the housing 22 as shown in FIG. 1. An internal magnet 44 is also installed, and placed on an interior surface 36 of the housing wall 16, within the interior of the housing, to match up with the knob magnet 41 outside the housing, and also to match up with a magnetic record/stop function 47 of the camera 14, as shown in FIG. 6.

For use with the present intention, the knob magnet 41 may be referred to a "boss magnet" and the internal magnet 44 as a "worker magnet," in that the boss magnet directs the following action or sympathetic movement of the worker magnet along the interior surface 36 of the housing wall 16. Additionally, the magnetic record/stop function 47 of the camera 14 is unique to certain cameras, as typified by the preferred "Contour HD" video camera. Instead of the conventional, mechanical switch for the record/stop function, the Contour cameras employ a magnetic switching that is internal to the camera, which is normally actuated by a mechanical control on the exterior of the camera. A feature of the control system 10 of the present invention utilizes the internal, worker magnet to activate and control the magnetic record/stop function of the Contour camera.

To operate the record/stop functions of the camera 14 through the housing 11, the user presses the pin 26 of the push-button power control 20 to turn on the camera. The push-button control 20 is additionally employed to check the camera's status and activate the camera's positioning lasers. The user then rotates the knob 40 of the magnetic control 35 clockwise to start recording, and then rotates the control knob counter clockwise to stop recording, as shown in FIG. 1, to control the magnetic record/stop function 47 of the camera.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

The following is claimed:

1. A control system for an underwater camera housing comprising:
   a pin extended through a housing wall of the underwater camera housing at a pin penetration, the pin having an exterior end and an interior end, and a ring seat around the pin at a mid-length location on the pin;
   a clamp ring receivable onto the pin at the ring seat;
   a gland O-ring receivable onto the exterior end of the pin;
   a washer receivable onto the exterior end of the pin, positionable between the gland O-ring and the clamp ring, to form an assembled pin;
   a washer well included within an interior side of the housing wall, the washer well centered upon the pin penetration, and the washer well for receiving the assembled pin;
   a spring receivable into a bushing, the interior end of the pin receivable into an assembled spring and bushing, the bushing having a seat and the spring compressible by the action of the clamp ring to compress the spring against the seat of the bushing;
   a bushing well included in the interior side of the housing wall, the bushing well centered upon the pin penetration and the washer well, the bushing well for receiving the assembled spring and bushing;
   the exterior end of the pin repeatedly depress-able by a user, to extend the interior end of the pin through the housing wall into the underwater camera housing, to contact a control button of a camera within the underwater camera housing;
   a knob rotatably attached to an exterior surface on the housing wall of the underwater camera housing, the knob having a boss magnetic element proximate to a perimeter of the knob;
   a worker magnetic element positioned on an interior surface of the housing wall, proximate to the boss magnetic element, the worker magnetic element attracted to and movable by to the boss magnetic element across the housing wall; and
   the knob rotatable to move the boss magnetic element and thereby cause sympathetic movement of the worker magnetic element along the interior surface of the housing wall, to control a function of the camera within the underwater camera housing.

2. The control system for an underwater camera housing of claim 1, wherein:
   a user rotates the knob with the boss magnetic element, to selectively start or stop a recording function of the camera within the underwater camera housing, by directing an attractive movement of the worker magnetic element along the inside surface of the housing wall.

3. The control system for an underwater camera housing of claim 1, wherein:
the boss magnetic element is contained within the knob, and the knob is exterior to the housing wall of the underwater camera housing.

4. The control system for an underwater camera housing of claim 1, wherein:
the worker magnetic element moves along the inside surface of the housing wall.

5. A control system for an underwater camera housing comprising:
a knob rotatably attached to an exterior surface on a housing wall of the underwater camera housing, the knob having a boss magnetic element proximate to a perimeter of the knob;
a worker magnetic element positioned on an interior surface of the housing wall, proximate to the boss magnetic element, the worker magnetic element attracted to and movable by to the boss magnetic element across the interior of the housing wall; and
the knob rotatable to move the boss magnetic element and thereby cause sympathetic movement of the worker magnetic element along the interior surface of the housing wall, to control a function of a camera within the underwater camera housing.

6. The control system for an underwater camera housing of claim 5, additionally including:
a pin extended through the housing wall of the underwater camera housing at a pin penetration, the pin having an exterior end and an interior end, and a ring seat around the pin at a mid-length location on the pin;
a clamp ring receivable onto the pin at the ring seat;
a gland O-ring receivable onto the exterior end of the pin;
a washer receivable onto the exterior end of the pin, positionable between the gland O-ring and the clamp ring, to form an assembled pin;
a washer well included within an interior side of the housing wall, the washer well centered upon the pin penetration, and the washer well for receiving the assembled pin;
a spring receivable into a bushing, the interior end of the pin receivable into an assembled spring and bushing, the bushing having a seat and the spring compressible by the action of the clamp ring to compress the spring against the seat of the bushing;
a bushing well included in the interior side of the housing wall, the bushing well centered upon the pin penetration and the washer well, the bushing well for receiving the assembled spring and bushing; and
the exterior end of the pin repeatedly depress-able by a user, to extend the interior end of the pin through the housing wall into the underwater camera housing, to contact a control button of the camera within the underwater camera housing.

7. The control system for an underwater camera housing of claim 5, wherein:
a user rotates the knob with the boss magnetic element, to selectively start or stop a recording function of the camera within the underwater camera housing, by directing an attractive movement of the worker magnetic element along the inside surface of the housing wall.

8. The control system for an underwater camera housing of claim 5, wherein:
the boss magnetic element is contained within the knob, and the knob is exterior to the housing wall of the underwater camera housing.

9. The control system for an underwater camera housing of claim 5, wherein:
the worker magnetic element moves along the inside surface of the housing wall.

* * * * *